US006421737B1

(12) United States Patent
Stone et al.

(10) Patent No.: US 6,421,737 B1
(45) Date of Patent: Jul. 16, 2002

(54) MODULARLY IMPLEMENTED EVENT MONITORING SERVICE

(75) Inventors: Bradley A. Stone, Sunnyvale; Thomas A. Murray, Mountain View; Bruce N. Campbell, Cupertino, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/850,542

(22) Filed: May 2, 1997

(51) Int. Cl.[7] .................................................. G06F 9/54

(52) U.S. Cl. ...................................... 709/318; 709/224

(58) Field of Search ................................ 709/218, 223, 709/224, 226, 310–400, 200–253

(56) References Cited

U.S. PATENT DOCUMENTS

| 5,109,486 | A | * | 4/1992 | Seymour | |
|---|---|---|---|---|---|
| 5,421,015 | A | * | 5/1995 | Khoyi et al. | 709/107 |
| 5,655,081 | A | * | 8/1997 | Bonnell et al. | 709/202 |
| 5,764,955 | A | * | 6/1998 | Doolan | 709/223 |
| 5,774,669 | A | * | 6/1998 | George et al. | 709/224 |
| 5,781,703 | A | * | 7/1998 | Desai et al. | 706/50 |
| 5,870,555 | A | * | 2/1999 | Pruett et al. | 709/223 |
| 5,913,037 | A | * | 6/1999 | Spofford et al. | 709/226 |
| 5,931,911 | A | * | 8/1999 | Remy et al. | |
| 5,960,176 | A | * | 9/1999 | Kuroki et al. | 709/223 |
| 5,961,594 | A | * | 10/1999 | Bouvier et al. | 709/223 |
| 5,961,595 | A | * | 10/1999 | Kawagoe et al. | 709/223 |
| 5,996,010 | A | * | 11/1999 | Leong et al. | 709/223 |

OTHER PUBLICATIONS

*RS/6000 Cluster Systems HACMP for AIX Version 3 and 4 Introduction*, by IBM Corporation having a home page address of http://www.software.ibm.com.
*Solstice SyMON 1.1*, from the World Wide Web at http://www.eu.sun.com/servers/news/launch/products/symon.html.
*HP OpenView IT/Operations Integrated Network and Systems Management*, Part No. 5965-7231E from Hewlett-Packard Company, 1997.
*High Availability MC/ServiceGuard*, made available on the World Wide Web by Hewlett-Packard Company at the following World Wide Web address: http://www.unixsolutions.hp.com/products/ha/mcsg.html.
*HP MC/ServiceGuard*, made available on the World Wide Web by Hewlett-Packard Company at the following World Wide Web address: http://www.unixsolutions.hp.com/products/sys_mgmt/v2500_04.html.

* cited by examiner

*Primary Examiner*—St. John Courtenay, III
*Assistant Examiner*—G. Lawrence Opie

(57) ABSTRACT

Selected resources of a computing system are monitored. A user interacting with a resource management client discovers the resources currently available to be monitored and then selects which resources of the computing system are to be monitored. Also, the user selects monitor parameters for each resource. Then, for each resource selected, the resource management client forwards to a resource monitoring manager a monitor request to monitor the resource. The resource monitoring manager reformats the monitor request to form a reformatted monitor request. The resource monitoring manager forwards the reformatted monitoring request to one of a plurality of resource monitor modules. The resource monitor module which receives the reformatted monitoring request monitors the resource.

21 Claims, 4 Drawing Sheets

MODULARLY IMPLEMENTED EVENT MONITORING SERVICE

BACKGROUND

The present invention concerns monitoring resources on a computer and pertains particularly to a resource monitor which is implemented using monitor modules.

In computing systems it is often desirable to monitor the operation and status of various resources within the computing system. Once status changes or particular events are detected, these may be sent to an application or management platform for further processing and/or for being made available to a user.

For example, status changes or particular events detected by a resource monitor may be received by a resource monitoring management program such as the OpenView resource monitoring management program available from Hewlett-Packard Company, having a business address of 3000 Hanover Street, Palo Alto, Calif. 94304, or the MC/ServiceGuard resource monitoring management program, also available from Hewlett-Packard Company. Other existing products such as the High Availability Clustered Multi-Processing (HACMP) control application available from IBM Company.

One deficiency with existing resource monitoring management programs such as those listed above is that it is often hard to add to the systems new resource monitors or to take advantage of other types of resource monitors. Support for a new resource monitor within a resource monitoring management program typically requires the ability to make application programmer interface (API) calls to the new resource monitor. Further, the new resource monitor needs to be designed to have the ability to send events using the API calls currently recognized by the resource monitoring management program, or the existing resource monitoring management program needs to be redesigned to recognize the events sent by the new resource monitor. Thus adding a new resource monitoring capability to such a resource monitoring system requires at least a new release of the resource monitoring management program and may require significant redevelopment to sufficiently update the resource monitoring management program.

SUMMARY OF THE INVENTION

In accordance with the preferred embodiment of the present invention, resources of a computing system are monitored. A user interacting with a resource management client selects which resources of the computing system are to be monitored. Also, the user selects monitor parameters for each resource. For example, the monitor parameters can be a resource polling interval, a notification schedule, a notification protocol, notification options and/or some other parameter which is deemed of interest to a user. Then, for each resource selected, the resource management client forwards to a resource monitoring manager a monitor request to monitor the resource. The resource monitoring manager reformats the monitor request to form a reformatted monitor request. The resource monitoring manager forwards the reformatted monitoring request to one of a plurality of resource monitor modules. The resource monitor module which receives the reformatted monitoring request monitors the resource.

In the preferred embodiment of the present invention, the resource monitoring manager stores information about each resource monitor module in a resource dictionary. In response to a request for information from the resource management client about a first resource, the resource monitoring manager searches for the information within the resource dictionary. When the information is within the resource dictionary, the information is obtained from the resource dictionary. For example, the information may include text which is managed and stored by the resource monitoring manager.

When the information is not within the resource dictionary, the information is obtained from a first resource monitor module which is associated with the first resource. This is done, for example, by sending an information request to the first resource monitor module and receiving an information reply back from the first resource monitor module. The information is then forwarded from the resource monitoring manager to the resource management client.

In the preferred embodiment, the resources are grouped into classes, and where desirable, further into subclasses. and subclasses. The actual resource instances for a class or subclass may be known only by the resource monitoring module. Therefore, when a user selects a resource class (or subclass),the resource management client forwards to a resource monitoring manager, an identification request to identify resource instances within the resource class (subclass). The resource monitoring manager reformats the identification request to form a reformatted identification request. The resource monitoring manager forwards to a first resource monitor module the reformatted identification request. The resource monitoring manager uses the resource dictionary to determine the appropriate resource monitor module to contact. The first resource monitor module returns to the resource monitoring manager resource instances within the resource class (subclass). The resource monitoring manager returns to the resource management client the resource instances within the resource class (subclass). Resource subclasses may be further subdivided into more specialized subclasses, but ultimately resource instance information is sent back to the resource management client. The resource instances are then displayed to the user for selection.

Also in the preferred embodiment, at most one instance of a resource monitoring module is active on the system at any one time. However, instances of multiple resource monitoring modules are able to be active on the system at any one time. Further, an instance of a multiple resource monitoring module is active only when the resource management client has requested monitoring of a resource associated with the instance.

The use of a resource monitoring manager introduces flexibility of the interface between one or more resource management clients and various resource monitor modules. Standardization of the interface between the resource monitoring manager and resource monitor modules allows resource monitor modules to be easily added and removed from the system without a redesign of the resource monitoring manager or the resource management client. Storage of registration within the resource monitoring manager allows resource monitor modules to be added and removed dynamically (i.e., while the computer system is running). The ability of the resource monitoring manager to obtain information from memory modules allows for a resource management client to discover dynamically the existence and capabilities of resource monitor modules that are currently running on the system. In particular, a resource management client needs only to know the type of resource to be monitored. Through interactions with the resource monitoring manager the client learns about the specific resources available to be monitored. Additionally, the interface between the resource monitoring manager and various resource management clients can be modified, for example, to allow for new reporting methods, without requiring any changes to the existing resource monitor modules.

DESCRIPTION OF THE PREFERRED EMBODIMENT

Figure 1:
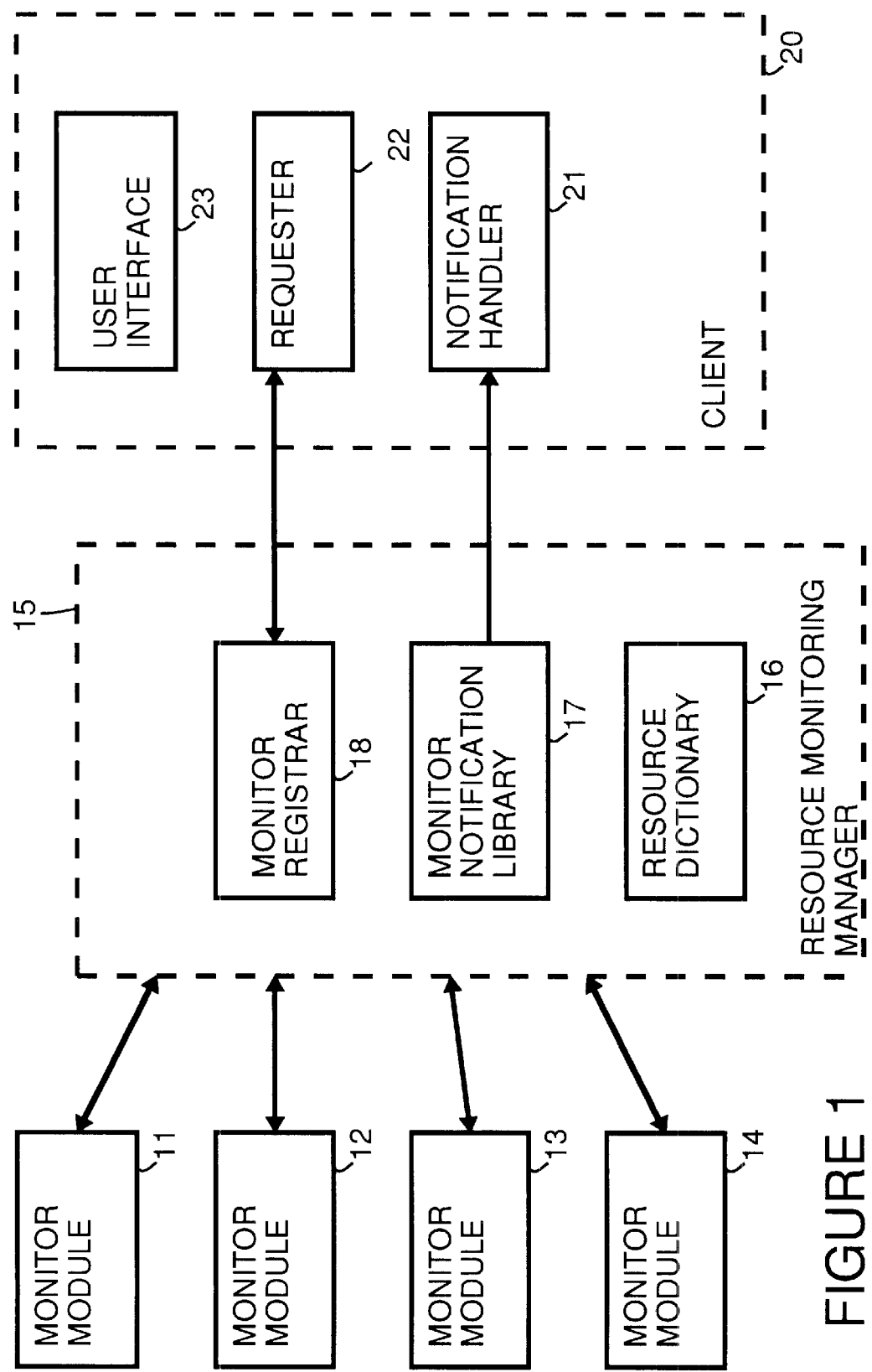
FIG. 1 shows a block diagram of a resource monitoring system in accordance with a preferred embodiment of the present invention.

FIG. 1 shows a block diagram of a resource monitoring system in accordance with a preferred embodiment of the present invention. A resource monitor module 11, a resource monitor module 12, a resource monitor module 13 and a resource monitor module 14 each monitor a system resource. The system resources monitored may include, for a example, a network interface, central processing unit (CPU) statistics, a network server and/or any other resource within a computing system.

A specific resource monitoring module is provided for data stored in standard Management Information Base (MIB) variables. Interactions with resource monitoring manager 15 allows for notifications involving MIB variables to be sent using mechanisms other than the standard Simple Network Management Protocol (SNMP).

Division of resources into resource classes and subclasses is useful for configuration purposes and makes it possible for a user to discover new monitors and resources dynamically. Resource classes are categories of resources. For example, there could be a resource class which includes disk drives and a resource class that includes local area networks (LAN). When a resource class is large, the resource class can be divided into several resource subclasses. When a resource subclass is large, the resource subclass can also be divided into more specific subclasses.

The most specific subclasses (or classes if there are no subclasses) are composed of resource instances. A resource instance is an actual instantiation of a resource or resource class. For example, "lan0" may refer to a particular network interface that is installed on the computing system.

Each of resource monitor modules 11 through 14 is a process or command or script that is used to obtain the status of a particular resource. Each resource monitor module checks one or more resources on the local system and provides event notifications, if appropriate. The resource monitor modules 11 through 14 each communicate with a resource monitoring manager 15 using a standard interface, as is more fully described below.

Resource monitoring manager 15 includes a monitor registrar 18, a monitor notification library 17 and a resource dictionary 16. Resource monitoring manager 15 interfaces between resource monitor modules 11 through 14 and a resource management client 20. A resource management client 20 includes a user interface 23, a requester 22 and a notification handler 21. While only a single resource management client is shown in FIG. 1, multiple resource management clients can simultaneously interact with resource monitoring manager 15.

User interface 23 provides a graphic user interface to a user of the system. When the user communicates to resource management client 20, through user interface 23, a request to use the resource monitor services, requester 22 makes a request to monitor registrar to determine the available resources. Monitor registrar 18 answers the request using data obtained from resource dictionary 16. When monitor registrar 18 receives a request that exceeds the scope of the information in resource dictionary 16, monitor registrar 18 will pass the request to a running resource monitor module or launch an appropriate resource monitor module and pass the requests down to that resource monitor module. The resource monitor module is determined by monitor registrar 18 doing a best match of the resource name specified by the user, matching the resource name left-to-right using a string comparison with entries in resource dictionary 16.

The resource monitor module which receives the requests will answer back to monitor registrar 18, which in turn will return the answer to requester 22. Since the information about resources is stored within the resource dictionary and/or is obtained from running resource monitor modules, this allows resource monitor modules to be added and/or subtracted without any changes being made to resource management client 20. Further, this allows for changes to resource monitor modules to be added and/or subtracted dynamically, that is, while resource management client 20 is running. In the preferred embodiment, the only part of resource monitoring manager 15 that changes when a new resource monitor module is added is resource dictionary 16, which stores information about the new resource monitoring module.

Figure 2:
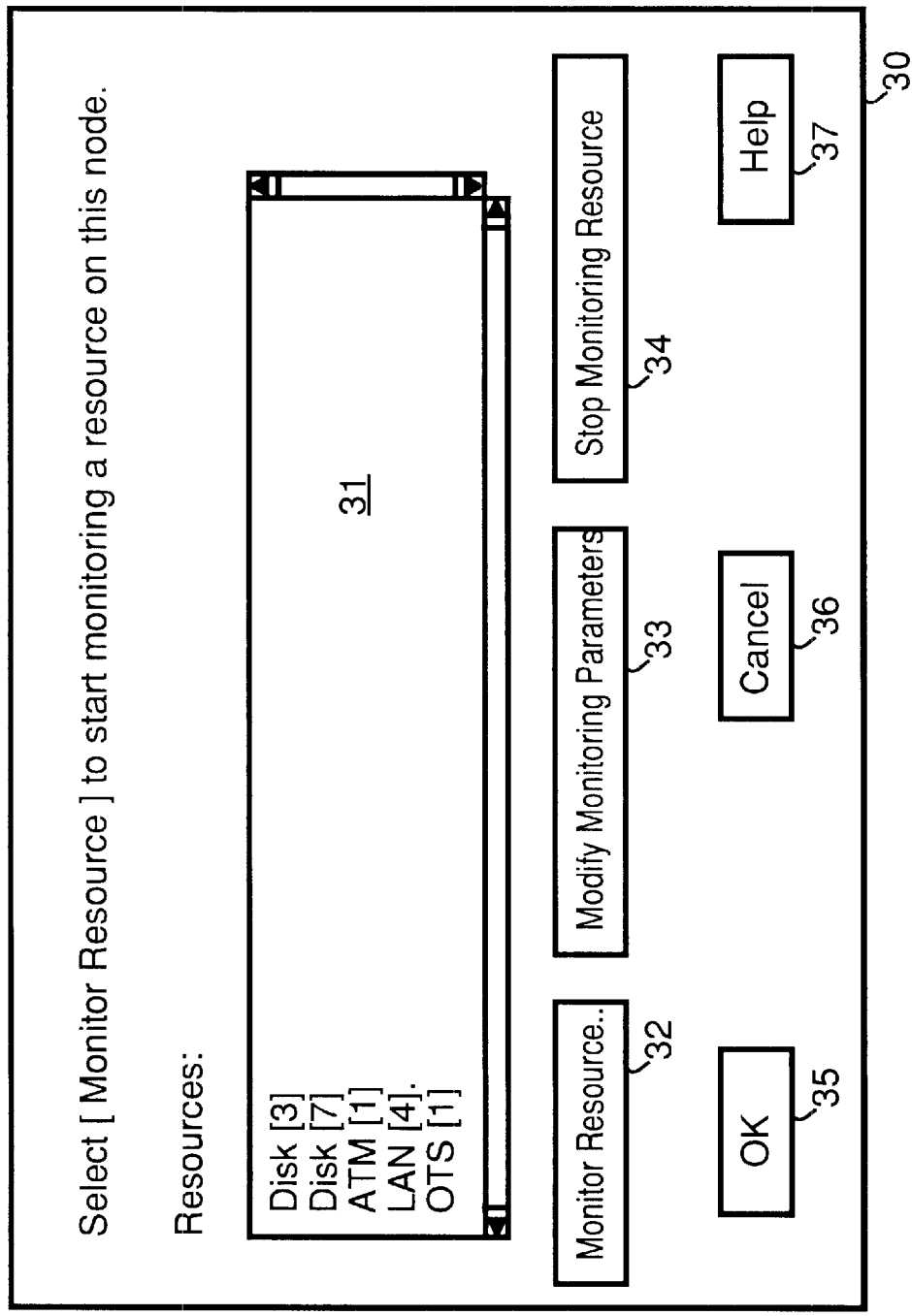
FIG. 2 shows a display window for a graphics user interface for a resource monitoring system in accordance with a preferred embodiment of the present invention.

The graphics user interface presented to a user by user interface 23 includes various windows or screens with which the user can interact. For example, FIG. 2 shows a "Top Level" window 30 which is used to inform a user as to which resources are currently being monitored. Resources currently being monitored are listed in an area 31. When a monitor resource button 32 is selected, the user is taken to a "Monitor Resources" window 40 (shown in FIG. 3) is shown. When a resource already being monitored is selected from area 31, and a modify monitoring parameters button 33 is selected, the user is taken to a "Monitoring Parameters" window 50 (shown in FIG. 4). "Top Level" window 30 also includes an OK button 35, a cancel button 36 and a help button 37.

Figure 3:
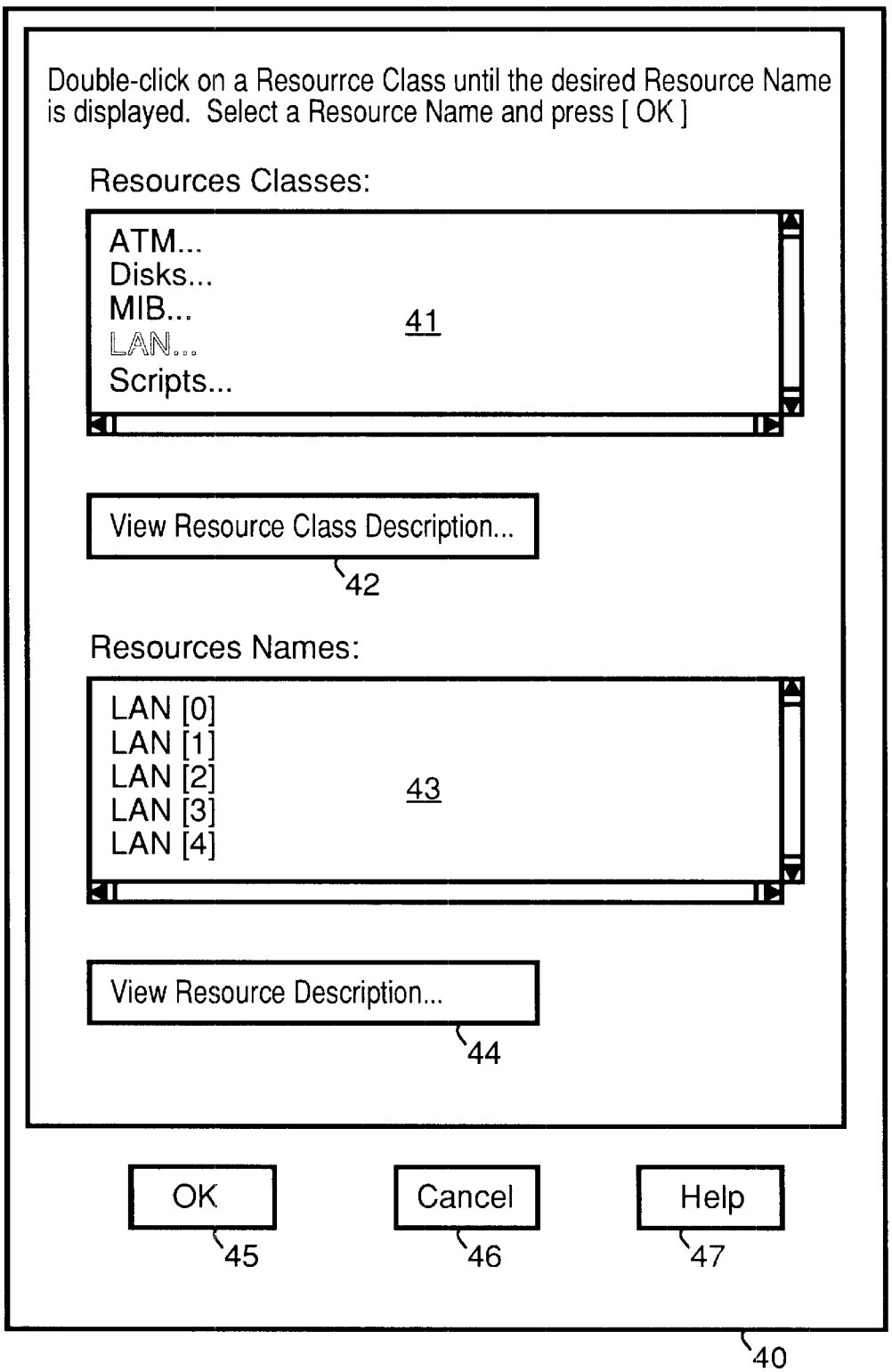
FIG. 3 shows another display window for a graphics user interface for a resource monitoring system in accordance with a preferred embodiment of the present invention.

The user arrives at "Monitor Resources" window 40, shown in FIG. 3 by selecting monitor resource button 32 of "Top Level" window 30, shown in FIG. 2. "Monitor Resources" window 40 displays available resource classes in area 41 and resource names in area 42 for a selected resource class. The user can navigate through the resource hierarchy by selecting a resource class in area 41 and then selecting a resource within the selected class in area 43. Information about a resource class selected in area 41 can be accessed by selecting a View Resource Class Description button 42. Information about a resource selected in area 43 can be accessed by selecting a View Resource Description button 44. As indicated above and further described below, the information displayed in "Monitor Resources" window 40 is obtained by resource management client 20 dynamically by sending requests for information to monitor registrar 18. "Monitor Resources" window 40 also includes an OK button 45, a cancel button 46 and a help button 47. Once a resource in area 43 is selected and OK button 45 is activated, the user is taken to "Monitoring Parameters" window 50, shown in FIG. 4.

Figure 4:
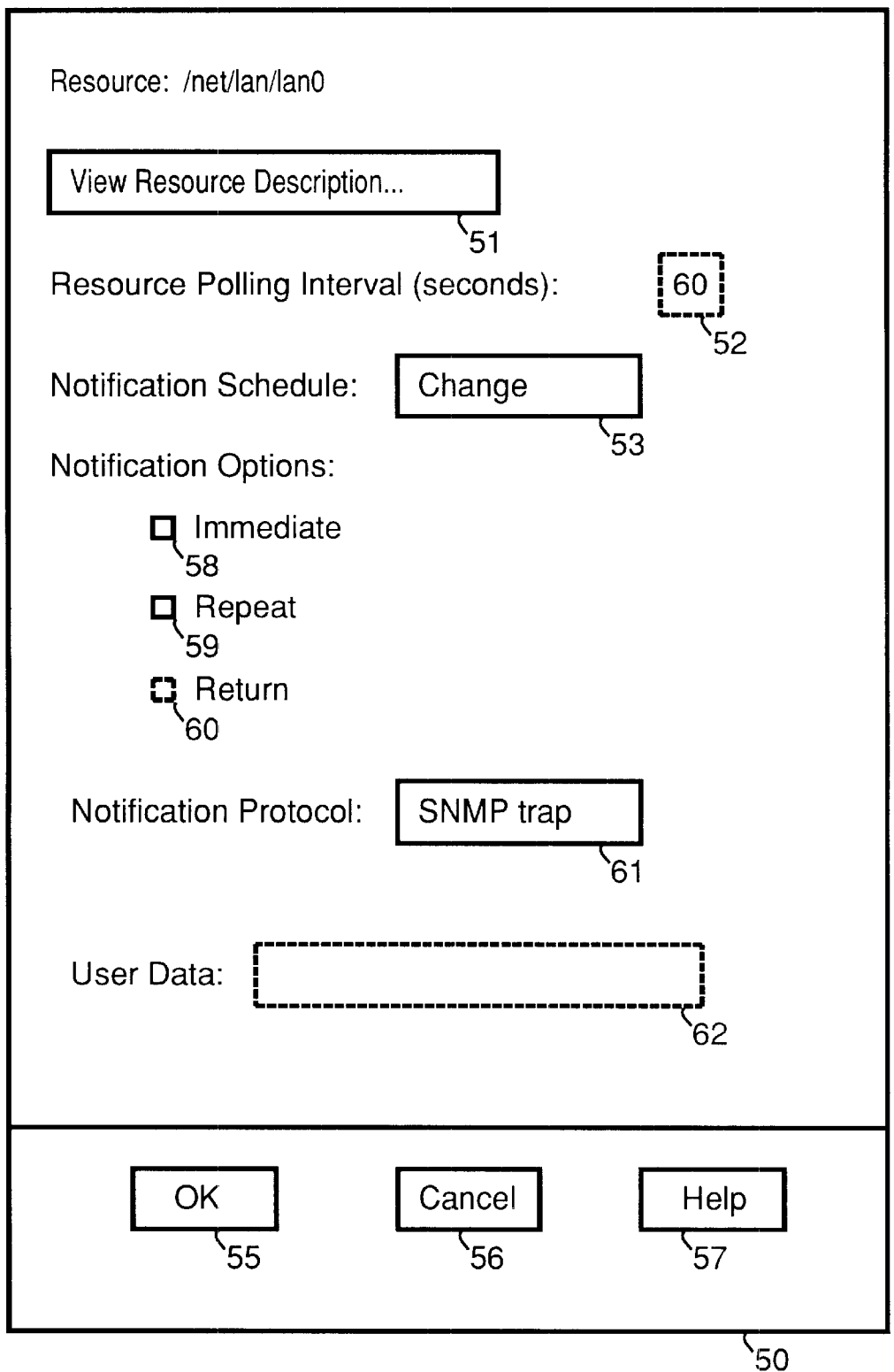
FIG. 4 shows another display window for a graphics user interface for a resource monitoring system in accordance with a preferred embodiment of the present invention.

The user arrives at "Monitoring Parameters" window 50, shown in FIG. 4 by selecting modify monitoring parameters button 33 of "Top Level" window 30, shown in FIG. 2, or by selecting a resource in area 43 and activating OK button 45 from "Monitor Resources" window 40. As indicated above and further described below, the information displayed in "Monitoring Parameters" window 50 is obtained by resource management client 20 dynamically by sending requests for information to monitor registrar 18. "Monitoring Parameters" window 50 includes an indication of various monitor parameters for the selected resource. A resource description can be viewed by activating a view resource description button 51. A resource polling interval is specified in a box 52. The resource polling interval specifies how often the resource monitor module should check whether the resource value meets the notification criteria.

A notification schedule is specified in a box 53. In the preferred embodiment the choices are forced notification, change notification and conditional notification. If forced notification is selected, the resource monitor module sends a notification message at every polling interval. If change notification is selected, the resource monitor module sends a notification message whenever the value of the resource changes. If conditional notification is selected, the resource monitor module sends a notification message whenever the resource value matches a specified criteria. The criteria is defined by an operator and a threshold value. The threshold value is used to compare against values of the operator reported by the resource monitor module.

Notification type is selected by choosing from among immediate notification selection button 58, repeat notification button 59 and return notification selection button. Immediate notification indicates the resource monitor module will send an initial notification message upon starting to monitor the resource. Repeat notification indicates that, when the notification schedule is not forced notification, the notification will continue as long as the criteria is still met. Return notification indicates that if the notification is not forced notification, notification will be sent by the resource monitor module when the resource value crosses the threshold and returns to "normal".

A notification protocol is set out in box 61. In addition to Simple Network Management Protocol (SNMP), other notification protocols such as the Transmission Control Protocol (TCP) or the User Datagram Protocol (UDP) may be used.

Additional user data may be written by a user into a box 62. "Monitoring Parameters" window 50 also includes an OK button 55, a cancel button 56 and a help button 57.

After the resources to monitor are identified by a user using user interface 23, requester 22 forwards monitoring requests to monitor registrar 18. Each monitoring request contains information about what to monitor and who to notify when something interesting happens, as indicated by the user using user interface 23. Monitor registrar 18 passes this information to the appropriate resource monitor module using a "Monitor request" message. The "Monitor request" messages sent from monitor registrar 18, for example, contain essentially the same information as the monitor requests sent from the requester 22 to monitor registrar 18, except however, that the "Monitor request" messages sent from monitor registrar 18 may be reformatted in order to conform to the implemented standard interface between resource monitoring manager 15 and the resource monitor modules.

The "Monitor request" message sent by monitor registrar 18 to the resource monitor module describes how a resource is to be monitored. The "Monitor request" message indicates, for example, what resources to monitor, how often to check, what values, events or series of events warrant notification and which resource management client to notify. This information is obtained, for example, from the information supplied by a user interacting with "Monitoring Parameters" window 50 shown in FIG. 4.

The resource monitor module which receives the request will check the resource as specified in the monitor request. The monitor request can be for immediate or periodic checking against thresholds or state changes. Additional monitor types also may be used. When the resource takes some action which requires notification, the resource monitor module will notify resource monitoring manager 15 through monitor notification library 17. Execution of the appropriate routine within monitor notification library 17 will result in the notification being forwarded to notification handler 21. The use of notification library 17 shield the resource monitor modules from having to know how to send notifications of a particular type.

In addition to "monitor request" other messages flow between monitor registrar 18 and the memory module. For example, a resource monitor module will send an "I am alive" message to monitor registrar to indicate that the resource monitor module is running and is able to accept requests.

In order to get resource subclasses, monitor registrar 18 sends to the resource monitor module a "Get subclass request" message. In response, the resource monitor module application sends a series of "Get subclass reply" messages, one "Get subclass reply" message for each existing subclass of the resource.

When monitor registrar 18 receives a request from resource management client 20 for descriptive information about a resource, monitor registrar 18 either obtains the information from resource dictionary 16 or passes along the request to an appropriate resource monitor module by sending an "Information request" message to the appropriate resource monitor module. The resource monitor module replies with an "Information reply" message which contains the requested information.

In order for monitor registrar 18 to determine which resources are being monitored by a particular resource monitor module, monitor registrar sends a "Status request message" to the resource monitor module. The resource monitor module returns a "Status reply" message which indicates which resources are being monitored.

Running resource monitor modules also can pass messages between themselves. For example, when a resource monitor module instance detects that another resource monitor module instance of itself is already running, the resource monitor module instance will send a "Stay alive" message, wait for a response, and then terminate. When a resource monitor module instance receives a "Stay alive" message, it returns a "Stay alive reply" message. This helps ensure that at most one instance of a resource monitor module is running on the system.

In the preferred embodiment, each resource monitor module responds to messages from monitor registrar 18 by making library calls for routines within the resource monitor module. For example, when executing a "Startup" call, the resource monitor module sets up communication with monitor registrar 18. If there is another instance of the resource monitor module, the resource monitor module negotiates with the other instance of the resource monitor module to see which will run. When resource monitor module has completed initialization, the resource monitor module will send an "I am alive" message to monitor registrar 18. Monitor registrar 18 will then register the resource monitor module as currently running and available.

When executing a "Receive Messages" call, the resource monitor module waits for messages from monitor registrar 18. While waiting, the resource monitor module handles messages passed between resource monitor modules (such as the "Stay alive" messages described above). Additionally the monitor module keeps track of the time to determine when any resources will need to be checked. The resource monitor module will return from the "Receive Messages" call when there is a message from monitor registrar 18 or when it is time for the resource monitor module to check the value of a resource.

When executing a "Build notification entry" call, the resource monitor module builds a notification entry. The notification entry is a structure for storing a request from monitor registrar 18 for a resource to be monitored. The notification entry includes the monitor request information, the current value of the resource to be monitored and some historical information about the resource. The "Build notification entry" call is made in response to monitor registrar 18 making a request for the resource to be monitored.

When executing a "Add notification entry" call, the resource monitor module adds a notification entry built with the "Build notification entry" call to a list of all other monitor requests received by the resource monitor module.

When executing a "Delete notification entry" call, the resource monitor module deletes a notification entry added with the "Add notification entry" call from the list of all other monitor requests maintained by the resource monitor module.

When executing a "Determine notification" call, the resource monitor module determines whether the value of a resource retrieved by the resource monitor module and placed into the notification entry structure for the resource, warrants sending a notification to the resource management client. This is done by checking the value of the resource against the notification criteria specified in the monitor request.

When executing a "Send event notification" call, the resource monitor module builds up a notification message based on the information in the notification entry. The notification is then sent to resource monitoring manager 15 which forwards the notification to requester 22 of resource management client 20. The "Send event notification" call is used whenever a notification is to be sent by the resource monitor module.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A system for monitoring resources within a computing system comprising:
   a resource management client which, in response to user interactions, selects resources of the computing system to monitor;
   a plurality of resource monitor modules which monitor the resources; and,
   a resource monitoring manager which includes a resource dictionary into which is stored information about each resource monitor module, the stored information including descriptive information about the resources, the resource monitoring manager, in response to a request for descriptive information about a first resource, searching for the descriptive information within the resource dictionary, wherein when the descriptive information is not within the resource dictionary, obtaining the descriptive information from a first resource monitor module which is associated with the first resource, the resource monitoring manager forwarding the descriptive information to the resource management client and wherein when the descriptive information is within the resource dictionary, forwarding the descriptive information from within the resource dictionary to the resource management client.

2. A system as in claim 1 wherein the resource monitoring manager obtains the descriptive information from the first resource monitor module by sending an information request to the first resource monitor module and receiving in response an information reply.

3. A system as in claim 1 wherein the resource management client selects monitor parameters for the resources, the monitor parameters including at least one of the following:
   resource polling interval;
   notification schedule;
   notification protocol; and
   notification options.

4. A system as in claim 1 wherein at most one instance of a resource monitoring module is active on the system at any one time.

5. A system as in claim 1 wherein instances of multiple resource monitoring modules are able to be active on the system at any one time.

6. A system as in claim 1 wherein an instance of a multiple resource monitoring module is active only when the resource management client has requested monitoring of a resource associated with the instance.

7. A system as in claim 1 additionally comprising additional resource management clients which concurrently interact with the resource monitoring manager to monitor resources.

8. Storage media which stores software which when executed by a computing system performs a method for monitoring resources of the computing system, the method comprising the steps of:
   (a) selecting, in response to a user interacting with a resource management client, which resources of the computing system to monitor;
   (b) for each resource selected in step (a), monitoring the resource by a resource monitor module;
   (c) storing information about each resource monitor module in a resource dictionary within a resource monitoring manager, the stored information including descriptive information about the resources being monitored; and,
   (d) in response to a request for descriptive information about a first resource, performing the following substeps by the resource monitoring manager:
      (d.1) searching for the descriptive information within the resource dictionary,
      (d.2) when the descriptive information is not within the resource dictionary, obtaining the descriptive information from a first resource monitor module which is associated with the first resource, (d.3) forwarding the descriptive information from the resource monitoring manager to the resource management client, and (d.4) when the descriptive information is within the resource dictionary, obtaining the descriptive information from the resource dictionary and not obtaining the descriptive information from the first resource monitor module which is associated with the first resource.

9. Storage media as in claim 8 wherein substep (d.2) includes the following substeps performed when the descriptive information is not within the resource dictionary:

sending an information request from the resource monitoring manager to the first resource monitor module; and, sending an information reply from the first resource monitor module to the resource monitoring manager.

10. Storage media as in claim 8 wherein in substep (d.4) the descriptive information is text which is managed and stored by the resource monitoring manager.

11. Storage media as in claim 8 wherein in step (a) includes selecting monitor parameters that include at least one of the following:

resource polling interval;

notification schedule;

notification protocol; and notification options.

12. Storage media as in claim 8 wherein in step (a), upon the user selecting a resource class, the following substeps are performed:

forwarding, from the resource management client to a resource monitoring manager, an identification request to identify resource instances within the resource class;

reformatting the identification request by the resource monitoring manager to form a reformatted identification request;

forwarding, from the resource monitoring manager to a first resource monitor module, the reformatted identification request;

returning, from the first resource monitor module to the resource monitoring manager, resource instances within the resource class;

returning, from the resource monitoring manager to the resource management client, the resource instances within the resource class; and, displaying the resource instances to the user for selection.

13. Storage media as in claim 8 wherein in step (a), upon the user selecting a resource subclass, the following substeps are performed:

forwarding, from the resource management client to a resource monitoring manager, an identification request to identify resource instances within the resource subclass;

reformatting the identification request by the resource monitoring manager to form a reformatted identification request;

forwarding, from the resource monitoring manager to a first resource monitor module, the reformatted identification request;

returning, from the first resource monitor module to the resource monitoring manager, resource instances within the resource subclass;

returning, from the resource monitoring manager to the resource management client, the resource instances within the resource subclass; and, displaying the resource instances to the user for selection.

14. Storage media as in claim 8 wherein step (b) includes the following substeps:

(b.1) forwarding, from the resource management client to a resource monitoring manager, a monitor request to monitor the resource;

(b.2) reformatting the monitor request by the resource monitoring manager to form a reformatted monitor request; and (b.3) forwarding, from the resource monitoring manager to one of a plurality of resource monitor modules, the reformatted monitoring request.

15. A method for monitoring resources of a computing system comprising the steps of:

(a) selecting, in response to a user interacting with a resource management client, which resources of the computing system to monitor;

(b) for each resource selected in step (a), monitoring the resource by a resource monitor module;

(c) storing information about each resource monitor module, the stored information including descriptive information about the resources being monitored, in a resource dictionary within a resource monitoring manager; and, (d) in response to a request for descriptive information about a first resource, performing the following substeps by the resource monitoring manager:

(d.1) searching for the descriptive information about the first resource within the resource dictionary, (d.2) when the descriptive information is not within the resource dictionary, obtaining the descriptive information from a first resource monitor module which is associated with the first resource, and (d.3) forwarding the descriptive information from the resource monitoring manager to the resource management client, and (d.4) when the descriptive information is within the resource dictionary, obtaining the descriptive information from the resource dictionary and not obtaining the descriptive information from the first resource monitor module which is associated with the first resource.

16. A method as in claim 15 wherein substep (d.2) includes the following substeps performed when the descriptive information is not within the resource dictionary:

sending an information request from the resource monitoring manager to the first resource monitor module; and, sending an information reply from the first resource monitor module to the resource monitoring manager.

17. A method as in claim 15 wherein in substep (d.4) the descriptive information is text which is managed and stored by the resource monitoring manager.

18. A method as in claim 15 wherein in step (a) includes selecting monitor parameters that include at least one of the following:

resource polling interval;

notification schedule;

notification protocol; and notification options.

19. A method as in claim 15 wherein in step (a), upon the user selecting a resource class, the following substeps are performed:

forwarding, from the resource management client to a resource monitoring manager, an identification request to identify resource instances within the resource class;

reformatting the identification request by the resource monitoring manager to form a reformatted identification request;

forwarding, from the resource monitoring manager to a first resource monitor module, the reformatted identification request;

returning, from the first resource monitor module to the resource monitoring manager, resource instances within the resource class;

returning, from the resource monitoring manager to the resource management client, the resource instances within the resource class; and, displaying the resource instances to the user for selection.

20. A method as in claim 15 wherein in step (a), upon the user selecting a resource subclass, the following substeps are performed:

forwarding, from the resource management client to a resource monitoring manager, an identification request to identify resource instances within the resource subclass;

reformatting the identification request by the resource monitoring manager to form a reformatted identification request;

forwarding, from the resource monitoring manager to a first resource monitor module, the reformatted identification request;

returning, from the first resource monitor module to the resource monitoring manager, resource instances within the resource subclass;

returning, from the resource monitoring manager to the resource management client, the resource instances within the resource subclass; and, displaying the resource instances to the user for selection.

21. A method as in claim 15 wherein step (b) includes the following substeps:

(b.1) forwarding, from the resource management client to a resource monitoring manager, a monitor request to monitor the resource;

(b.2) reformatting the monitor request by the resource monitoring manager to form a reformatted monitor request; and (b.3) forwarding, from the resource monitoring manager to one of a plurality of resource monitor modules, the reformatted monitoring request.

* * * * *